United States Patent [19]
Shaw et al.

[11] Patent Number: 5,813,680
[45] Date of Patent: Sep. 29, 1998

[54] HAND TRUCK WITH EXPANDABLE SECONDARY CONTAINMENT RESERVOIR

[75] Inventors: Mark D. Shaw, Ponte Vedra Beach; J. Tad Heyman; Laurence M. Bierce, both of Jacksonville, all of Fla.

[73] Assignee: UltraTech International, Inc., Jacksonville, Fla.

[21] Appl. No.: 717,768

[22] Filed: Sep. 23, 1996

[51] Int. Cl.[6] ........................................................ B62B 1/26
[52] U.S. Cl. ...................... 280/47.26; 220/573; 220/723; 280/79.2; 280/79.5; 414/490
[58] Field of Search ................................... 414/444, 490; 280/47.18, 47.19, 47.26, 47.28, 47.35, 79.2, 79.5, 79.6; 220/571, 573, 720, 723; 141/86, 87

[56] References Cited

U.S. PATENT DOCUMENTS

| | | | |
|---|---|---|---|
| 4,153,155 | 5/1979 | Benno | 220/573 X |
| 4,610,039 | 9/1986 | Stern | 220/404 X |
| 4,696,186 | 9/1987 | Sharp | 220/723 X |
| 4,842,139 | 6/1989 | Krieg | 280/796.6 X |
| 5,007,557 | 4/1991 | Spence | 220/571 |
| 5,099,872 | 3/1992 | Tarvin et al. | 220/573 X |
| 5,285,989 | 2/1994 | Zilbert et al. | 141/87 X |
| 5,417,344 | 5/1995 | Wells et al. | 280/79.5 X |
| 5,480,191 | 1/1996 | Litin et al. | 280/47.26 X |
| 5,527,052 | 6/1996 | Litin et al. | 280/47.26 |
| 5,642,834 | 7/1997 | Shaw et al. | 220/720 |

Primary Examiner—James W. Keenan
Attorney, Agent, or Firm—Thomas C. Saitta

[57] ABSTRACT

A handtruck for transporting and supporting in a generally horizontal position liquid dispensing drums, the handtruck having a secondary containment means to retain any spills or leakage, the secondary containment means having one or more expandable containment means connected in fluid communication, such that a large volume of liquid will force the expandable containment means into the expanded state, thereby greatly increasing the liquid retention capacity of the device.

10 Claims, 4 Drawing Sheets

HAND TRUCK WITH EXPANDABLE SECONDARY CONTAINMENT RESERVOIR

BACKGROUND OF THE INVENTION

This invention relates generally to the field of hand trucks which are designed for transporting large fluid containing drums, and especially hand trucks designed to support the drum in a horizontal position for dispensing the liquid into smaller containers. More particularly, the invention relates to such hand trucks which have built-in secondary containment means to retain any liquid spillage or leakage occurring from failure of the drum or sloppiness during the liquid transfer step. Even more particularly, the invention relates to such hand trucks which have expandable secondary containment means whereby the entire volume of liquid can be retained in the secondary containment means if necessary.

Modern society requires the use of many liquids which are hazardous to the environment, and modern society also produces many environmentally hazardous waste liquids. These liquids must be stored, shipped or dispensed, and there has been much development in the area of secondary containment devices to be used with hazardous liquids to prevent the liquid from contaminating the environment in the event of spills or leaks from the primary containers. One very common type of primary liquid container is a metal or polymer drum or barrel, usually sized for capacities of 30, 55 or 83 gallons. The drum is cylindrical with a generally flat top and bottom, the top having a small, offset opening for dispensing the liquid. Since primary containers of this size are relatively heavy, it is usually necessary to transport the individual drums with a hand truck, a device having a generally extended frame with curved drum support beams, handle means connected to the top of the frame, a protruding nose pad, which is a plate or platform mounted adjacent the bottom of the frame at an angle of 90 degrees or more, and two wheels mounted to either side of the frame adjacent the nose plate. The typical hand truck is used by sliding the nose pad under the drum and tilting the hand truck and drum backwards together until the weight of the drum is balanced onto the wheels.

When a drum is to be used for dispensing liquids from a horizontal position, hand trucks have been developed which also incorporate a base member or legs extending beneath the frame, whereby the truck and drum together can be tilted onto the floor so that the drum rests in a generally horizontal or inverted low angle position beyond horizontal. The hand truck itself becomes the support means to maintain the drum in the desired dispensing position. With these devices, the drums can be transported to a desired location, then positioned horizontally for dispensing purposes without removing the drum from the hand truck. When loading the drum onto the hand truck, the drum is positioned relative to the hand truck such that the dispensing opening is adjacent the frame of the hand truck, insuring that the dispensing opening is located at the lowermost point when the drum and hand truck combination is lowered to the horizontal position.

Liquid leakage or spillage can occur in two ways in these circumstances. The first is where a rupture occurs in the drum itself, the second is leakage or spillage during the dispensing operation. Hand trucks have been developed to address these potential problems, such a hand truck being designed whereby the frame forms a secondary container or receiver means, the drum itself being the primary container, the secondary container means having generally vertical walls and a solid bottom when positioned horizontally. The upper portion of the hand truck frame is extended such that the interior of the containment sump or reservoir extends a distance beyond the top of the drum to allow smaller receiving containers or buckets to be placed into the extended area during the filling process. The shortcoming of this solution to the leakage and spillage problem is that the secondary containment sump area must be made large enough to contain relatively large volume spills, meaning the hand truck itself must be greatly oversized.

It is an object of this invention to provide a hand truck for transporting and then supporting drums in a generally horizontal or low angle dispensing position, the hand truck having a large volume secondary containment means, where the secondary containment means is expandable in response to the volume of the spill such that the size of the hand truck can be kept to a minimum. It is a further object to provide such a device where the secondary containment means retains small volume spills without expansion, but which expands automatically in response to a large volume spill. It is a further object to provide such a device where the expandable secondary means comprises one or more bladder means which occupy a small volume when in the stored position but which can expand to increase the volume of the secondary containment means when needed.

SUMMARY OF THE INVENTION

The invention is a hand truck, or an adaptor for a hand truck, for transporting a liquid-containing drum or other primary liquid container and supporting this primary container in a generally horizontal dispensing position, the hand truck comprising secondary containment means for capturing and retaining any liquid leakage or spillage occurring from failure of the drum itself, such as from punctures, cracks or ruptures, or from liquid loss during reckless or negligent transfer of liquid from the drum to smaller containers. The hand truck generally comprises a generally elongated frame with handle means, wheels, and a protruding nose pad affixed to the base of the frame, the pad being of low height and mounted to the frame at an angle of 90 degrees or more. The pad extends sufficient distance to provide support when slid underneath the drum to allow pick-up and transport of the drum. The frame is preferably provided with curved drum support means adapted to correspond with the curved wall of the drum to maintain the drum on the hand tuck in a stable manner. The frame and handles are designed such that the hand truck, with the drum in place, can be tipped completely on its side to rest on the floor with the frame or handles providing stable support for the drum, such that the drum is tilted at least 90 degrees from vertical.

The hand truck further comprises secondary containment means which is adapted to receive and contain a large volume of liquid when the hand truck is in the horizontal dispensing position. The secondary containment means comprises a reservoir or sump area formed by a bottom and side walls which are part of or affixed to the frame of the hand truck. The secondary containment means further comprises an expandable containment member which is adapted to provide additional volume in excess of the volume provided for by the reservoir area, in the event that the volume of liquid escaping form the primary liquid container exceeds that of the reservoir. The expandable containment member comprises a bladder or bag communicating with the reservoir area and is preferably made of thin-walled, flexible or elastic polymer material or the like which when folded or rolled will occupy only a relatively small space, yet is self-expanding from the pressure of any large volume of liquid entering the reservoir area. In this manner the overall size and dimensions of the secondary containment means of the hand truck are minimized such that the hand truck remains relatively light-weight and easy to use, yet the secondary containment means is capable of expanding to maximize its capture volume to retain large volume liquid spills which exceed the minimal capacity of the reservoir area when necessary.

DETAILED DESCRIPTION OF THE INVENTION

Figure 1:
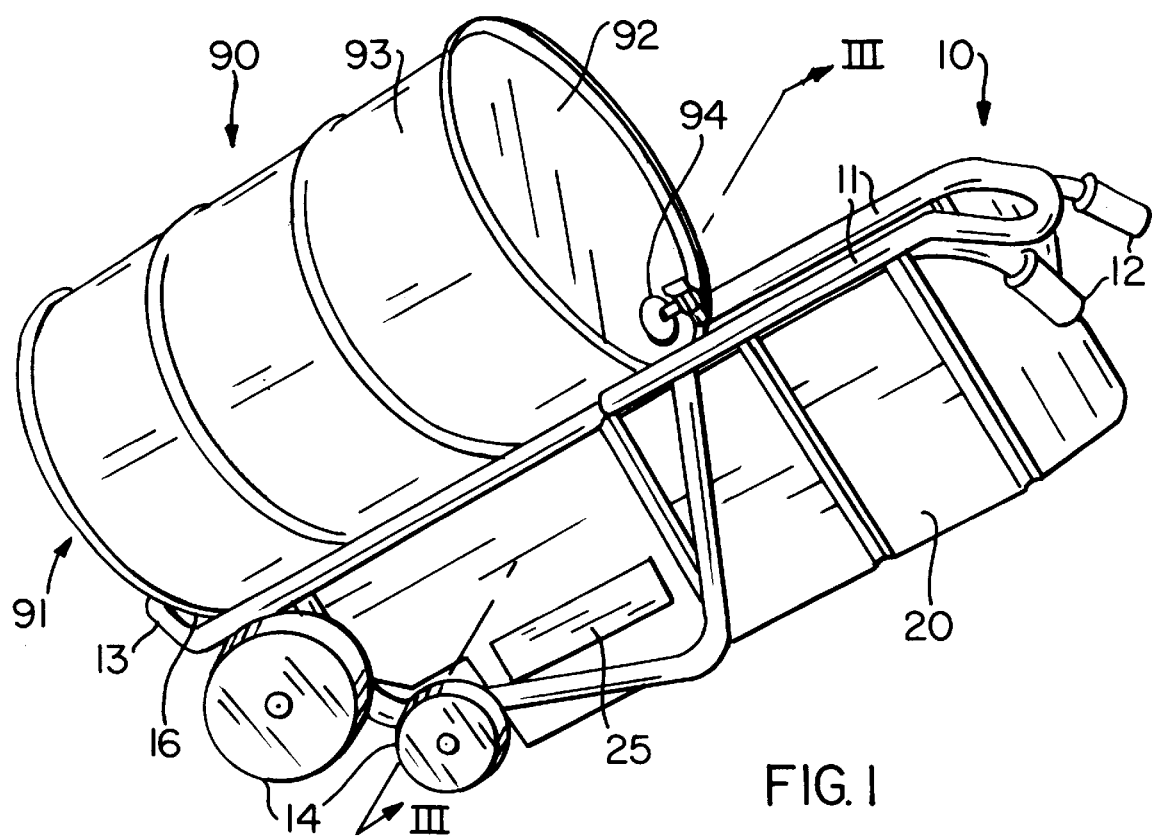
FIG. 1 is a perspective view of the device showing transport of a drum.
Figure 2:
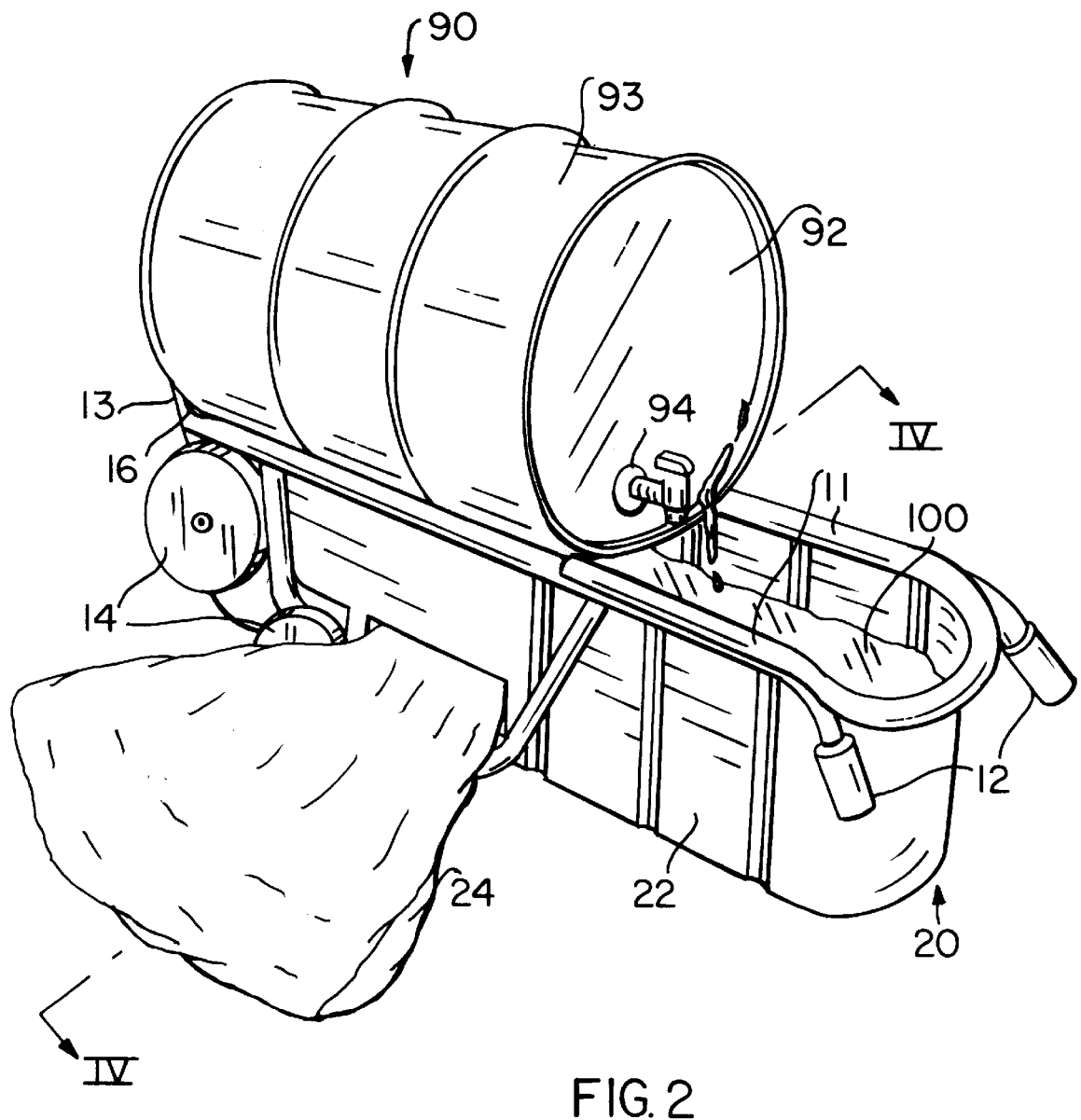
FIG. 2 is a perspective view of the device showing the drum and handtruck in the dispensing position with the expandable containment means in the expanded position.

With reference to the drawings, the invention will now be described in detail with attention to the best mode and preferred embodiment. In general, as shown in FIG. 1, the invention is a handtruck 10 for the transportation and support, in a generally horizontal dispensing position, of a relatively large, primary container 90 for liquids, such as for example a 30, 55 or 83 gallon drum or barrel having a generally planar bottom 91 and top 92 joined by a cylindrical wall 93, with a dispenser port or means 94 affixed to its top 92, such that liquid 100 will flow through the dispenser means 94 when the drum 90 is tipped approximately 90 degrees or more from vertical orientation into a generally horizontal or inverted past horizontal position, as shown in FIG. 2. The handtruck 10 comprises a structural frame 11 of a generally rectangular configuration with a single or pair of handles 12 affixed to the upper end, a nose pad 13 affixed to its lower end at an angle of approximately 90 degrees or greater relative to the frame 11, and one or more sets of wheels 14 mounted onto the lower end of frame 11. Preferably, the frame 11 is equipped with curved drum support members 15 to retain and stabilize the cylindrical wall 93 of drum 90. The frame 11 is also preferably equipped with a pair of angled shoulders 16 adjoining the nose pad 13, such that when the nose pad 13 is slid under a drum 90 and the drum 90 is tilted back into the horizontal position, the angled shoulders 16 cause the drum 90 to shift a short distance toward the upper end of the frame 11.

The handtruck 10 further comprises a secondary containment means 20 connected to or formed as part of frame 11, the secondary containment means 20 comprising a bottom 23 and side walls 22 joined together to form a reservoir area 21 to receive and retain any liquid 100 which may leak from the drum 90 or be spilled during transfer of the liquid from the primary container 90 to other smaller containers. The secondary containment means 20 is typically formed of a durable, rigid, strong polymer and the bottom 23 is preferably configured to act as the supporting base or legs to maintain the handtruck 10 and drum 90 in the horizontal position, although it is also possible to affix depending legs from the frame 11 of handtruck 10 to support the drum 90 horizontally. The purpose of the secondary containment means 20 is to prevent environmental damage from liquid 100 spilling from drum 90. Since these drums 90 may contain a relatively large volume of liquid 100, the secondary containment means must be capable of retaining the full volume of drum 90, and regulations often require that the secondary containment means be capable of retaining even greater volumes.

Figure 3:
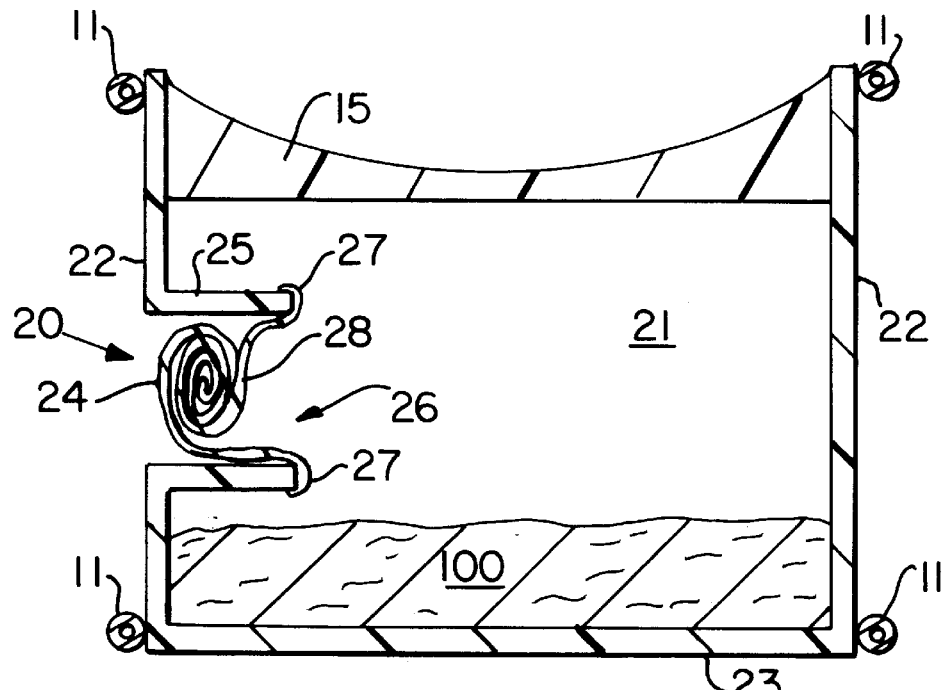
FIG. 3 is a cross-sectional view taken along line III—III of FIG. 1, showing the expandable containment means in the non-expanded state.
Figure 4:
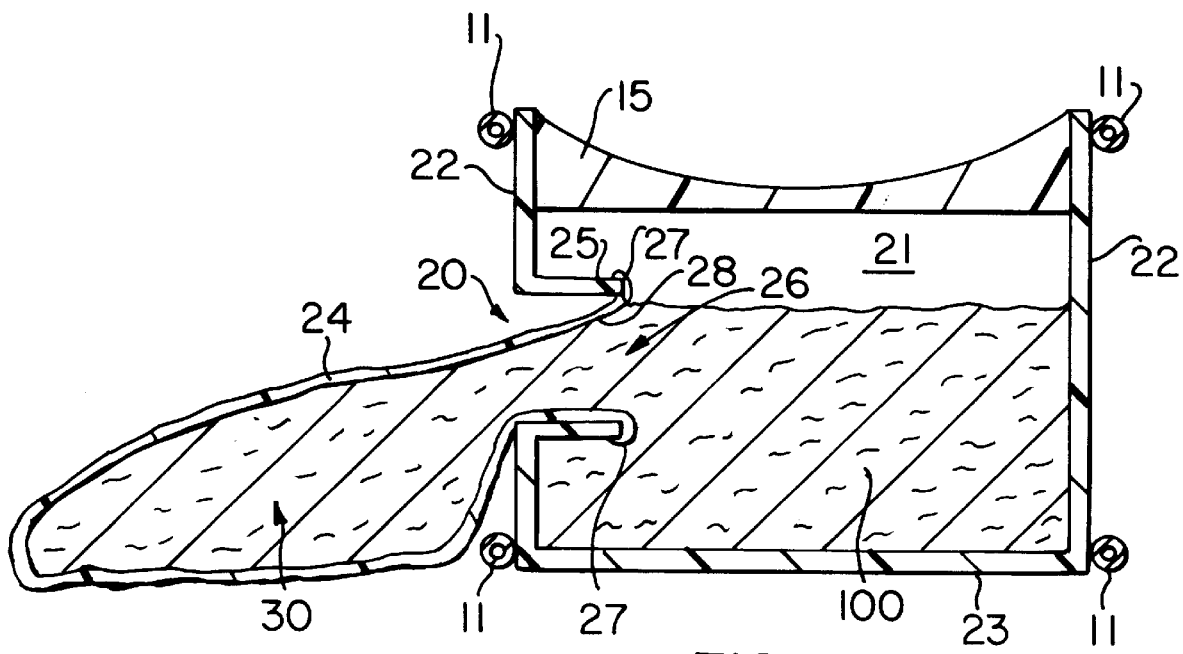
FIG. 4 is a cross-sectional view taken along line IV—IV of FIG. 2, showing the expandable containment means in the expanded state.
Figure 5:
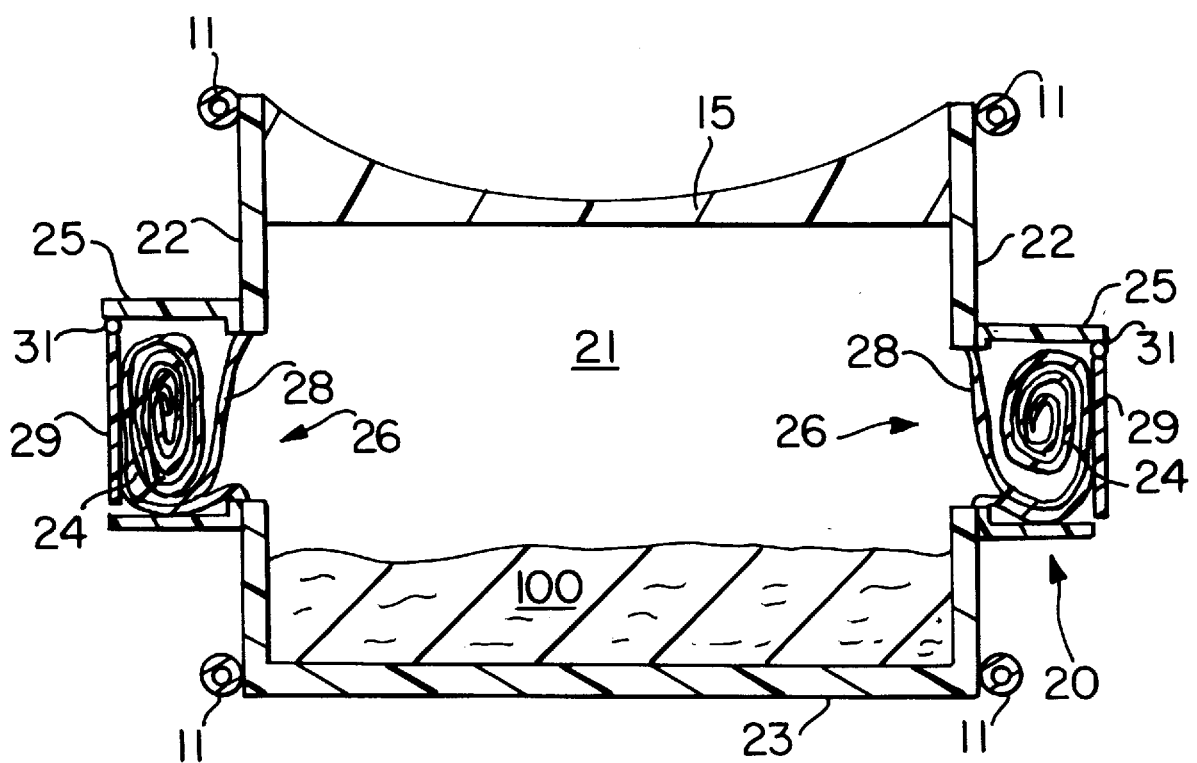
FIG. 5 is a cross-sectional view similar to FIG. 3, showing two expandable containment means mounted externally to opposing side walls of the secondary containment means.

Referring now to FIGS. 2, 3 and 4, it is shown that the secondary containment means of the handtruck 10 further comprises expandable containment means 24 which is joined in fluid communication with the reservoir 21 of the secondary containment means 20. Expandable containment means 24 preferably comprises a relatively thin-walled bag or bladder composed of a durable, flexible polymer material. The bladder 24 may be constructed of a single or multiple layers, of similar or different polymers having different characteristics relating to durability, chemical resistance, or the like. The expandable containment bladder means 24 has a bladder opening 28 which is connected to a port 26 in a side wall 22 of secondary containment means 20, the bladder opening 28 being affixed, such as by attachment to a lip 27, to retain the bladder 24 such that liquid may flow from the reservoir 21 into the interior 30 of the bladder 24. The expandable containment means 24 is constructed such that it can be retracted, compressed, folded or rolled into a relatively tight configuration which occupies very little space in comparison to the space occupied when it is unrolled or unfolded. The retracted bladder means 24 is stored in the non-expanded configuration in a storage area or compartment 25, which may be positioned internally to a side wall 22 of secondary containment means 20, as shown in FIGS. 3 and 4, or which may be mounted externally to a side wall 11, as shown in FIG. 5. The storage compartment 25 may be constructed as an integral component of secondary containment means 20, or may be a separate element attached to the secondary containment means 20 in a fluid-tight manner. A panel or door 29 may be connected to the outside of storage compartment 25 by a hinge 31 or other means which allow the door 29 to pivot open when the expandable containment means 24 begins to expand.

In operation, small spills are retained in the base of the reservoir 21 of secondary containment means 20, as shown in FIG. 3. Should a catastrophic failure occur in the primary liquid container 90, the level of the liquid 100 in the reservoir 21 will rise to the level of the port 26 connecting to the expandable containment means 24. As liquid 100 begins to fill the bladder 24, the pressure forces the bladder 24 to automatically unroll through door 29. Once unrolled and extended out from the storage compartment 25, the large interior 30 of the bladder 24 is capable of retaining a large volume of liquid 100, as shown in FIGS. 2 and 4. This enables the overall size and weight of the secondary containment means 20 to be minimized, as the total retention volume for the device is not the volume of the reservoir 21 alone, but is the combined volume of the reservoir 21 and the expandable containment means 24. The larger the volume of the expandable containment means 24, the smaller the reservoir 21 that is required. Alternatively, plural storage compartments 25 and expandable containment means 24 may be attached to the secondary containment means 20, as shown in FIG. 5, allowing for the use of smaller volume bladders 24. The use of multiple bladders 24 also allows the device to be constructed with a built-in excess retention volume as a safety factor, in the event that one of the bladders 24 is prevented from fully expanding by other objects near the handtruck 10, such as a wall, other drums, etc.

It is understood that equivalents and substitutions of certain elements may be obvious to those skilled in the art, and the true scope and definition of the invention therefore is to be as et forth in the following claims.

We claim:

1. A secondary containment device for use in combination with a hand truck structured for the transportation and support in a generally horizontal dispensing position of a primary container for liquid, said hand truck comprising a generally rectangular wheeled frame having a nose plate and curved support members to support said primary liquid container and handles, said secondary containment device comprising means for the retention of liquid when said primary container is placed in a generally horizontal dispensing position, said secondary containment device comprising a bottom combined with side walls to form a liquid retaining reservoir, means to connect said side walls to a frame of a handtruck, and at least one port in said side walls, and expandable containment means joined in fluid connection to said at least one port, said expandable containment means comprising a liquid retaining bladder which occupies a small volume in the non-expanded state, but which is automatically expanded by the pressure of liquid flowing through said at least one port.

2. The device of claim 1, where said secondary containment device further comprises at least one storage compartment to retain said expandable containment means in a non-expanded configuration.

3. The device of claim 2, where said at least one storage compartment is mounted internally to said side walls.

4. The device of claim 2, where said at least one storage compartment is mounted externally to said side walls.

5. The device of claim 1, where said bottom of said secondary containment device supports the hand truck in the horizontal position.

6. A combination hand truck and secondary containment device for the transportation and support in a generally horizontal dispensing position of a primary container for liquid, said hand truck comprising a generally rectangular wheeled frame having a nose plate and curved support members to support said primary liquid container and handles, said secondary containment device comprising means for the retention of liquid when said primary container is placed in a generally horizontal dispensing position, said secondary containment device comprising a bottom combined with side walls to form a liquid retaining reservoir and at least one port in said side walls, said side walls being connected to said frame of said hand truck, and expandable containment means joined in fluid connection to said at least one port, said expandable containment means comprising a liquid retaining bladder which occupies a small volume in the non-expanded state, but which is automatically expanded by the pressure of liquid flowing through said at least one port.

7. The device of claim 6, where said secondary containment device further comprises at least one storage compartment to retain said expandable containment means in a non-expanded configuration.

8. The device of claim 7, where said at least one storage compartment is mounted internally to said side walls.

9. The device of claim 7, where said at least one storage compartment is mounted externally to said side walls.

10. The device of claim 6, where said bottom of said secondary containment device supports the hand truck in the horizontal position.

\* \* \* \* \*